United States Patent [19]
Zinsmeyer

[11] Patent Number: 5,163,586
[45] Date of Patent: Nov. 17, 1992

[54] AUTOMOTIVE FUEL ADDITIVE DISPENSING AND BLENDING SYSTEM

[75] Inventor: Herbert G. Zinsmeyer, Austin, Tex.

[73] Assignee: Additive Systems Inc., Austin, Tex.

[21] Appl. No.: 702,170

[22] Filed: May 20, 1991

Related U.S. Application Data

[63] Continuation-in-part of Ser. No. 472,236, Jan. 30, 1990, Pat. No. 5,018,645.

[51] Int. Cl.$^5$ .............................................. B67D 5/30
[52] U.S. Cl. ........................................ 222/14; 222/28; 222/71; 222/132; 222/145
[58] Field of Search ....................... 222/14, 16, 26, 28, 222/71, 132, 144.5, 145

[56] References Cited

U.S. PATENT DOCUMENTS

| | | | |
|---|---|---|---|
| 3,756,463 | 9/1973 | Gravina | 222/26 |
| 3,847,302 | 11/1974 | Krone et al. | 222/14 |
| 3,895,738 | 7/1975 | Buchanan et al. | 222/26 |
| 3,913,787 | 10/1975 | Dilger | 222/26 |
| 3,934,756 | 1/1976 | Young et al. | 222/28 |
| 4,046,287 | 9/1977 | Hoekstra et al. | 222/16 |
| 4,131,215 | 2/1978 | Hansel | 222/26 |
| 4,568,248 | 2/1986 | Harders | 222/14 |

Primary Examiner—Andres Kashnikow
Assistant Examiner—Lesley D. Morris
Attorney, Agent, or Firm—Joseph F. Long

[57] ABSTRACT

An automotive fuel additive dispensing and blending system is described wherein both proprietary and mandated fuel additives heretofore normally added at the refinery or a bulk storage plant may be added at a service station and blended into the fuel as fuel is dispensed thereby allowing most effective and reliable addition of additives that may be volatile and that may degrade in storage after mixed with fuel as well as providing a cost effective method for supplying differing gasoline blends to the customer.

6 Claims, 3 Drawing Sheets

AUTOMOTIVE FUEL ADDITIVE DISPENSING AND BLENDING SYSTEM

This application is a continuation-in-part of Ser. No. 07/472,236, filed Jan. 30, 1990 now U.S. Pat. No. 5,018,645.

BACKGROUND OF THE INVENTION

In recent times gasoline refiners and marketers improve the various qualities of the gasolines supplied to the motoring public by blending a variety of additives with the fuel The need for additives has become ever more important because of the continuing demand by car owners for good engine performance from their high tech engines, while at the same time, keeping costs low and satisfying the needs for high fuel mileage and mandated low emission levels of air pollutants. As a result the oil companies have developed fuel additives and fuel components that are blended with the more-or-less commodity gasoline to improve the octane (antiknock) quality, remove carbon deposits from combustion chambers and fuel injectors, reduce emissions by adding oxygenates, and so on.

These complex fuel additives developed by the various oil companies are usually proprietary since they are intended to make their brand of gasoline more desirable to the motoring public, thereby causing brand allegiance and repeat customers.

The proprietary additive package, as it is usually called, is normally added at the bulk terminal. If the additive is of low volume, it is usually added when the fuel is loaded into transport trucks for delivery to service stations. Large volume "fuel component" kinds of additives require significant duplicate storage and handling facilities at the terminals. Different wholesale customers get different additive packages, and a given refinery or bulk plant will often supply more than a single chain of branded and unbranded service stations. Additive addition as outlined is complicated, and subject to error. Some additives are volatile and some begin to degrade once mixed with the fuel. Also, in some regions of the country, some additives are going to be mandated by the regional environmental regulators (such as the need for oxygenates for the Rocky Mountain region of the country). Therefore, since a refinery or bulk plant can typically serve a region within a 300 mile radius, it is becoming still more desirable to perform the addition and blending with additives at the service station. Further, since gasoline marketers often add different additive quantities to different fuel grades, it is most desirable to add these to the fuels at the retail fuel dispenser in the service station. This is especially important in the case of mandated addition because the regulatory testing for conformance will likely be done at the retail pump.

An objective of this invention is to provide an automatic fuel additive dispensing system that can be incorporated into service station fuel dispensers which will automatically blend a preset amount of one or more additives into the fuel as it is being delivered into the motorists gas tank. The preset amount of each additive to be blended will be in terms of a specified mix ratio according to the desires of the fuel marketer and environmental regulators. The additive dispenser system will allow the mix ratio for each additive to be set independently, and easily changed from time to time as the additive formulations are changed. Likewise, the additive dispenser will allow the mix ratios for the additives to be set differently for each fuel grade, according to the desires of the marketer.

When the volume of fuel additive blended with the fuel is a significant amount relative to the errors of measurement allowed by the Weights and Measures regulators, the additive volumes must be added to volume of fuel dispensed. For example, when the additive mix ratio is very low, such as in the order of about 1 cubic centimeter, or one milliliter, per gallon of fuel, the mix ratio is only about 0.026%. This is a rather insignificant amount compared to the W&M accuracy requirement of about 0.4% and therefore will probably not be an issue from a W&M standpoint. This is especially true if the additive amount dispensed will be in addition to the fuel volume for which the retail customer is actually charged.

But when the additive is of a larger volumetric ratio and becomes a significant portion of the fuel delivery, relative to the tolerated errors of fuel metering, the measured additive volume dispensed will have to be added to that of the fuel delivery for transaction purposes, and the accuracy of measurement will probably have to meet the 0.4%. This can be accomplished in one of two ways. The simplest and preferred method is to inject the additive into the fuel at a point that is upstream of the meter in the fuel dispenser. In that way the additive is measured along with the fuel. For cases where there is reason to inject the additive downstream of the meter, such as at the nozzle, this invention includes the facility for metering the additive volumes dispensed, and for this dispensed volume data to be transmitted to the fuel dispenser computer on a real time basis during fueling. With this information, the computer will add and include the additive volume dispensed with the metered fuel volumes for sales transaction purposes.

In this extension of the earlier disclosed system in Ser. No. 07/472,236, the choice of the additives becomes that of the gasoline marketer, and not that of the gasoline buying customer. Accordingly, the dispensed additive in this invention will not be the subject of a separate sales transaction. Instead, the additives simply become a part of each of the graded fuel products that the marketer wishes to sell as his proprietary fuel products, and at the posted prices as usual. This invention affords a more desirable, more effective, and much more controlled method of blending fuel additives that are offered by the fuel marketer, that may or may not be mandated by the regulatory authorities. This invention applies to any and all fuel additives, and to fuel components which are generally of larger volume ratios to the fuel volume. The term "additive" is used hereafter in this patent application for all such substances to simplify the wording.

A further objective of this invention is to provide a similar fuel additive dispensing and blending system for use with fuel blending retail dispensers. In these fuel blending dispensers a premium grade of gasoline is blended with a lower grade of gasoline to form one or more selectable intermediate grades of gasoline. For this case, this invention includes the ability to dispense and blend the fuel additives into both of the flowing streams of fuel according to preset mix ratios, or into the blended fuel stream according to preset mix ratios for each selectable grade.

The system comprises:
1. Fuel additive fluid storage tanks

2. Additive pumps with drive mechanism
3. Additive fluid meters

Note: The additive pump and meter may or may not be a single device such as a metering pump.

4. A distribution means that automatically directs the pumped and metered additive to the correct fuel line
5. Plumbing as required for the additives from the storage tank to the pump and meter, through the distribution system, and to the point where it is injected into the fuel stream. Normally a dual hose runs to the dispensing nozzle.
6. A controller that:
   a. monitors the existing fuel dispenser system to detect which fuel has been selected by the customer and the fuel flow rate in real time;
   b. sets the distribution system so as to deliver additive to the proper fuel line being used;
   c. regulates the additive pump motor and/or drive mechanism and in one embodiment, a fuel blend control valve in such a way that the additive pump delivers additive in chosen amounts proportional to the fuel flow rates as the fuel is delivered to the customer's gas tank; and
   d. sends additive-volume-dispensed signals to the fuel dispenser computer for inclusion with the fuel volume dispensed if the additive is being dispensed downstream of the fuel flow meter.

The controller function includes the capability to be preset to provide mix ratios of additive/fuel that are fixed thereafter, until changed once again. It is also capable of controlling multiple additive blender pumping systems as described above, each with independently set mix ratios as required for each of multiple additive fluids.

In this invention, the additive fluids can be delivered all the way to the fueling nozzle with flexible tubing as is disclosed in the prior referenced invention, or it may be delivered and injected into the fuel stream at some point within the hydraulics section of the fuel dispenser.

BRIEF DESCRIPTION OF THE INVENTION

The overall objective of this invention is to allow a bulk gasoline shipper selling to Service Stations to provide for blending of additives, and normal blending of fuels and then additive addition, as the fuel is dispensed to a customer. In some regions of the country different amounts of oxygenating material called oxygenates are required in gasoline and normally the bulk seller wishes to add proprietary additives. Usually proprietary additives are a small percentage in the dispensed gasoline but the oxygenates may be several percent. Our system provides for blending different amounts of different additives into the differing grades of fuel sold to customers in Service Stations including intermediate grades of fuel that are achieved by blending at the gasoline dispenser unit of the Service Station.

The system comprises the following major functional elements:

1. One or more additive fluid storage tanks with these storage tanks properly sized relative to the gasoline storage for normal additive use;
2. a minimum of one additive pump and drive mechanism for each additive storage tank;
3. an additive fluid meter for each different additive to measure additive flow into the gasoline as the gasoline additive mixture is dispensed;
4. a distribution system with control valve that may be controlled to direct additives as measured to the fuel line activated by the customer to dispense fuel;
5. Plumbing as required for the additives from the storage tank to the pump and meter, through the distribution system, and to the point where it is injected into the fuel stream.
6. A controller that:
   (a) monitors the existing fuel dispenser system to detect which fuel has been selected by the customer and the fuel flow rate in real time;
   (b) sets the distribution system so as to deliver additive to the proper fuel line being used;
   (c) and regulates the motor and/or drive mechanism in such a way that the additive pump delivers additive in chosen amounts proportional to the fuel flow rates as the fuel is delivered to the customer's gas tank; and
   (d) sends additive-volume-dispensed signals to the fuel dispenser computer for inclusion with the fuel volume dispensed if the additive is being dispensed downstream of the fuel flow meter.

In this invention, the additive fluids can be delivered all the way to the fueling nozzle with flexible tubing as is disclosed in the prior referenced invention, or it may be delivered and injected into the fuel stream at some point within the hydraulics section of the fuel dispenser, preferably upstream of the fuel flowmeter.

In some Service Stations intermediate grades of fuel are formulated from a high grade fuel and a low grade fuel. There may be one or more intermediate grades. Usually this formulation is accomplished using a valve called a blend control valve. The blend control valve operates in conjunction with electronic controls to measure a preset ratio of high grade fuel with its additives to low grade fuel with its additives. With fuel blending dispensers, two lines lead to the dispenser nozzle to mix the fuels at the nozzle. The two lines are necessary so that each customer will get only the properly mixed fuel and additive that he chooses and not first a line full of another mixed fuel that was left by the prior customer.

DETAILED DESCRIPTION OF THE DRAWINGS

Figure 1:
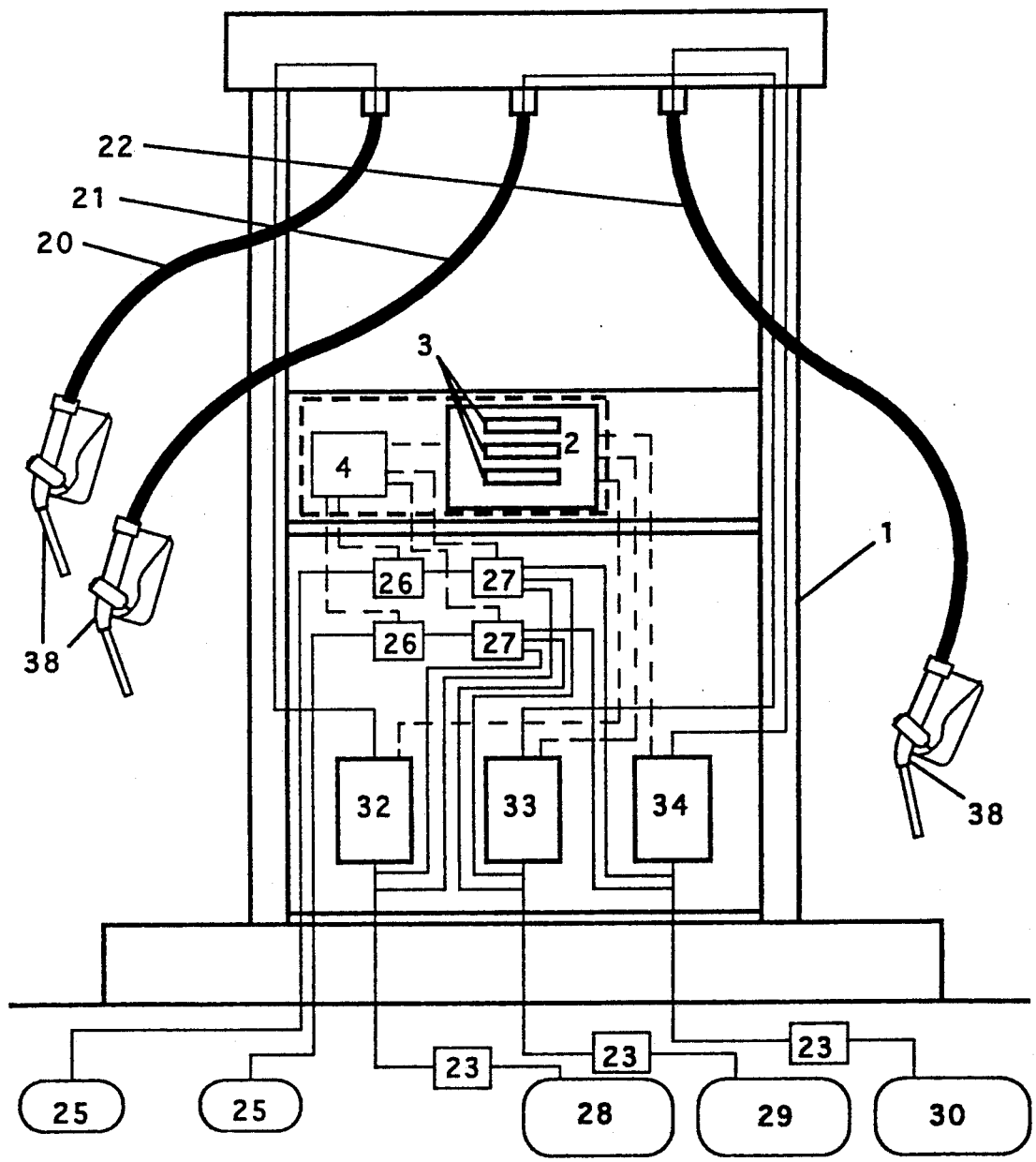
FIG. 1 shows internal components for fuel additive blending at the retail gasoline pump at pre-set but resettable ratios of additives to gasoline dispensed from the gas pump.

We may best describe details of the invention by a description of the drawing.

In FIG. 1 we show a service station fuel dispensing unit 1 with a fuel dispenser computer 2 and display panel 3. Displayed is price per gallon, gallons dispensed and price of the selected and dispensed fuel. In a preferred embodiment of this invention fuel dispenser computer 2 acts normally to include the cost and amount of the additive or additives blended into the fuel an includes amount of the additives in the amount of fuel displayed and includes cost of the additives in the total cost displayed. Note that fuel dispenser computer 2 may be connected and programmed to interact with a remote operator terminal and other modern service station transaction equipment.

Dispenser computer 2 also acts normally to activate fuel flow of one of three from storage tanks 28, 29, or 30 as chosen by the customer and delivers the selected fuel to the customer fuel tank, while receiving measured flow data from the respective fuel meter, and computes and displays the transaction data.

The functional elements of this embodiment of this invention are shown in schematic form. One or more additive storage tanks 25 are placed for storing the additives that the fuel marketing company wishes to blend and dispense with the fuel. The additives are pumped and metered by pumping and metering unit 26, which may be one or more separate devices and are shown here combined in a preferred embodiment inside the fuel dispensing unit housing. Additives then pass through a distribution system 27 controlled by controller 4 to cause the additives to be directed through appropriate plumbing and fittings to injection points in the fuel lines of the different grades of fuel, preferrably upstream of the fuel meters 32, 33 or 34 so that the dispensed additive volume is measured along with the fuel. The distribution system 27 is controlled to cause the additive to flow only to the one fuel line that is being used in any fuel dispensing transaction.

The controller 4 is a second computer which receives information from the fuel dispenser computer 2 indicating which fuel grade is being taken, and the rate of fuel flow on a real time basis during the fuel dispensing operation. The controller 4 includes means for presetting the additive mix ratios for each additive, and differently for each fuel grade if so desired by the marketer. This setting can include setting at the unit, or by remote programming from a console.

With the selected fuel 28, 29 or 30 and fuel flow rate information from fuel dispenser computer 2, and with the marketer's preset mix ratios, the controller 4 activates additive pressuring and measuring units 26, and distribution system 27 to pump and blend appropriate proportional amounts of the additives with the selected fuel flowing through one of flowmeter 32, 33, or 34 as the fuel is pumped by one of pumps 23 and dispensed into the motorist's fuel tank through nozzle 38.

Figure 2:
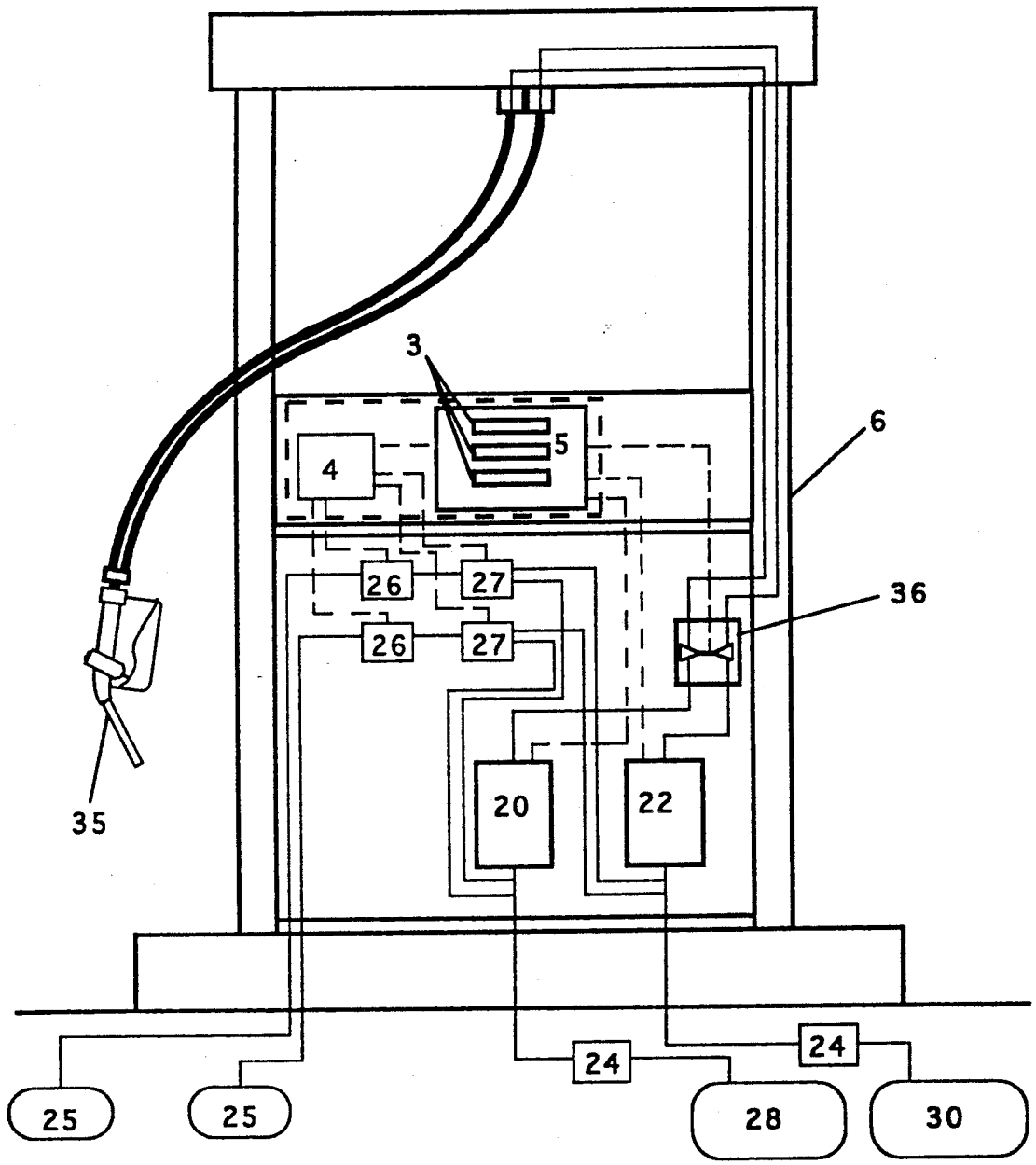
FIG. 2 shows internal components for fuel additive blending at the retail gasoline pump at preset but resettable ratios of additives to gasoline dispensed from the gas pump when the gas pump is of the fuel blending type that can produce intermediate grades of gasoline at the Service Station.
Figure 3:
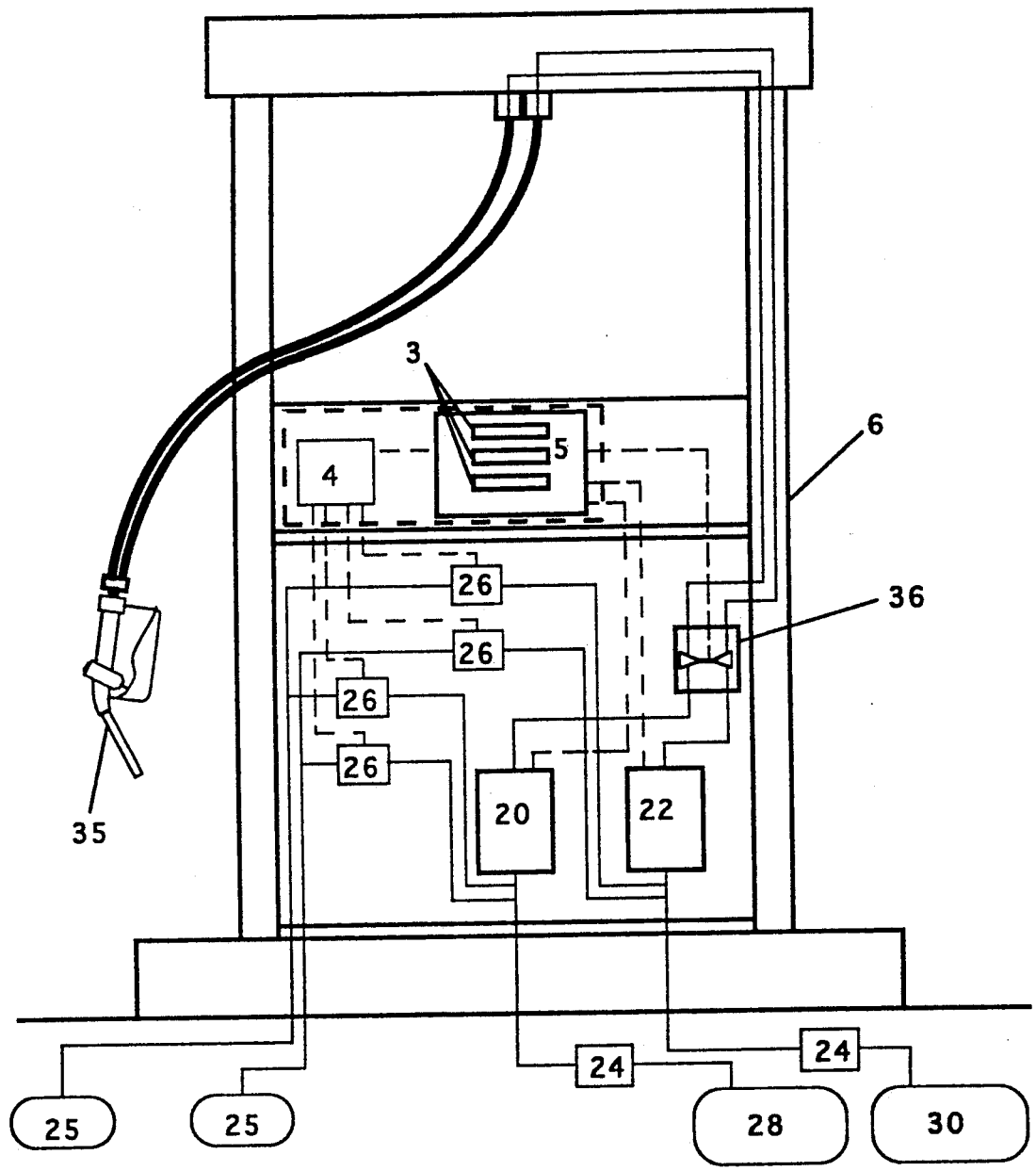
FIG. 3 shows a second embodiment for internal components when the gas pump is of the fuel blending type that can produce intermediate grades of gasoline at the Service Station.

The controller 4 can be a separate electronic module as drawn, or the controller 4 functions might be combined with those of the fuel dispenser computer 2 as a single unit as indicated in dashed lines on FIGS. 1, 2 and 3.

If the additive injection point is located for any reason downstream of the fuel flowmeter, the measured additive volumes will be transmitted on a real time basis from the controller 4 to the fuel dispenser computer 2 which will be programmed to add the additive fuel volume dispensed to the metered fuel volume through flowmeter 32, 33, or 34 for transaction purposes.

In FIG. 2 we show a second embodiment of the invention wherein additives are added at the dispensing unit 6 in a service station where the dispensing unit is a fuel blending type unit. The blending type dispensing unit 6 may be used to minimize number of fuel storage tanks and/or allow dispensing one or more intermediate fuel grades. Although additives may be used in all grades, additives alone are not usually sufficient to transform the lower or regular type fuel sold to a premium grade. In the blending type service station fuel dispenser normally a premium grade fuel and lower grade fuel may be sold separately or mixed to give intermediate grades. Our invention provides for having the proper additives for premium grade fuel and lower grade fuel in the fuel hoses at all times as well as proportional amounts of additives in the intermediate grade fuels.

The functional elements of the automated fuel additive dispenser system for the fuel blending type dispenser is shown schematically. With this fuel dispenser type there are two fuel tanks 28 and 30 with pumps 24, each having their respective fuel meters 20 and 22. There is also the typical fuel blend valve 36 that is controlled by the blending dispenser computer 5. The blending dispensing computer 5 is programmed to allow customer choices of regular or lower grade or premium grade or one of one or more intermediate fuel grades and receives flow rate signals in real time from the two fuel meters 20 and 22 during the fuel delivery. With this information, the computer 5 controls the fuel blend valve 36 so as to maintain the fuel blend ratio to the selected value through out the fuel delivery.

In a preferred embodiment of this invention, there are one or more storage tanks 25 placed for storing the additive, pressuring and measuring units 26, distribution system 27, and respective plumbing to carry the pumped, measured and distributed additive to the preferred injection points upstream of the fuel meters. The controller 4 receives fuel flow information from the fuel dispenser computer 5 and regulates the flow of additives being dispensed to maintain a preset mix ratio. However, in this case there are two fuels flowing with their two meters operating simultaneously. Therefore, this invention includes the added programmed ability of the fuel dispenser computer 5 and the controller 4 to communicate and receive, respectively, the real time fuel flow data from the two operating meters simultaneously. Controller 4 in this embodiment will cause additive amounts to be dispensed by pressuring and measuring units 26 for each additive and alternately as required through distribution systems 27 for each additive to each of the two fuel line injection points upstream of the fuel meters 20 and 22 so as to maintain the additive to fuel ratio to the correct preset value for each additive and for each of the two flowing fuels throughout the delivery.

As with the embodiments of FIG. 1, the functions of controller 4 might be combined and made a part of dispenser computer 5.

In the blending type service station unit 6 the dispenser nozzle 35 is fed from a line for lower grade fuel and a line for premium grade fuel. Blend control valve 36 controls ratio fed to the nozzle 35 so that a lower grade, one or more intermediate grades, or premium grade fuels may be dispensed with one nozzle.

In FIG. 3 we show a second embodiment for dispensing unit 6 that is a fuel blending type unit. In this second embodiment, two sets of controlled pressuring and measuring units 26 are provided for each additive with each unit 26 of each set delivering additive under control of controller 4 at a preset ratio of additive to fuel to one of the two fuels 28 and 30 upstream of fuel meters 20 and 22. With this design, the distribution system 27 as shown in FIG. 2 are eliminated. As in FIG. 2 blend control valve 36 acts to allow pumping a single fuel grade from tank 28 or tank 29 or mixtures thereof to form intermediate grades with a preset ratio of additives to fuel being added to each grade. Dual lines lead to dispenser nozzle 35 with mixing in the nozzle for intermediate fuel grades.

In addition to embodiments as outlined, one pump for each additive, pumping through each of two control valves to add a controlled measured flow of additive to each stream flowing through flowmeters 20 and 22 would come within the spirit and purpose of this invention.

Many minor mechanical or control features of this invention may be changed by one of normal skills in the art so we do not wish to be limited to exact details but only as to spirit and purpose as outlined in these claims and specifications.

What is claimed is:

1. An automotive fuel additive dispensing and blending system for a Service Station in stations comprising:
   (a) a minimum of one fuel additive storage tank and a minimum of one fuel storage tank;
   (b) an additive pumping and measuring means, a distribution system for each different fuel additive, a fuel dispenser computer in said dispensing unit, and a fuel measuring means; and
   (c) a controller; said controller being activated by activation of said fuel dispenser computer of said dispensing unit and acting to activate said additive pumping and measuring means to pump form said additive storage tank through said distribution system into fuel flowing to a chosen outlet nozzle of said fuel dispensing unit, said fuel additive entering into said fuel upstream of said fuel measuring means; said controller receiving input from said fuel additive pumping and measuring means and said fuel measuring means and activating said pumping and measuring means to control additive flow to said fuel flow according to a preset ratio of said additive to said fuel entered into said controller.

2. An automotive fuel additive dispensing and blending system for a Service Station in stations comprising: a plurality of fuel additive storage tanks supplying a pressuring and measuring means for each of said tanks and a controller and distribution system to feed additives form said plurality of fuel additive storage tanks in preselected ratios to premium fuel and in a preselected ratio to a lower grade fuel before mixing a preselected ratio of said premium fuel and said lower grade fuel to form a minimum of one intermediate grade of fuel.

3. A method for fuel additive dispensing and blending for a service station comprising:
   (a) starting a flow of chosen grade of fuel into a tank thereby activating equipment comprising:
      (1) a controller and a fuel dispenser computer;
      (2) a minimum of one fuel pump to pump from a minimum of one fuel storage tank;
      (3) a minimum of one fuel flowmeter;
      (4) a minimum of one additive pressuring and measuring means; and
      (5) a distribution system; said controller taking input form said minimum of one fuel flowmeter and said additive pressuring and measuring means and reacting through said distribution system and said additive pressuring and measuring means to feed a preset ratio of said additive upstream of said fuel flowmeter while said fuel is being dispensed;
   (b) closing a delivery valve to stop said flow of fuel thereby activating said fuel dispenser computer to display a total measure of amount of said fuel delivered along with total cost thereof.

4. A method for fuel additive dispensing and blending for a service stations as in claim 3 wherein functions of said controller and of said fuel dispenser computer are combined in one unit.

5. A method for fuel blending and additive addition at a service station comprising:
   (a) starting a flow of a chosen grade of fuel into a tank thereby activating equipment comprising:
      (1) a dispenser computer; said computer acting to activate fuel pumps and a controller; said controller acting to activate pressuring and measuring means and a distribution system to add additives in a preselected ratio to a premium grade of fuel and to add additives in a preselected ratio to a lower grade of fuel, and said dispenser computer acts to adjust a blend control valve downstream of said additive addition in order that a minimum of one grade of fuel between said premium grade and said lower grade of fuel in addition to said premium grade and said lower grade of fuels may be dispensed with additives;
   (b) closing a delivery valve to stop said flow of fuel thereby activating said fuel dispenser computer to display a total measure of amount of said fuel delivered along with total cost thereof.

6. An automotive fuel additive dispensing and blending system for a Service Station in stations comprising: a minimum of one fuel additive storage tank supplying a pressuring and measuring means for said tank and a controller and distribution system to feed additive from said minimum of one fuel additive storage tank in a preselected ratio to premium fuel and in a preselected ratio to a lower grade fuel before mixing a preselected ratio of said premium fuel and said lower grade fuel to form a minimum of one intermediate grade of fuel.

* * * * *